United States Patent [19]

Nakano et al.

[11] Patent Number: 5,807,528
[45] Date of Patent: *Sep. 15, 1998

[54] CATALYST FOR PURIFYING EXHAUST GAS

[75] Inventors: Masao Nakano, Hikari; Akinori Eshita; Kazuhiko Sekizawa, both of Shinnanyo, all of Japan

[73] Assignee: Tosoh Corporation, Shinnanyo, Japan

[ * ] Notice: The term of this patent shall not extend beyond the expiration date of Pat. No. 5,382,416.

[21] Appl. No.: 135,584

[22] Filed: Oct. 13, 1993

Related U.S. Application Data

[63] Continuation of Ser. No. 805,052, Dec. 11, 1991, abandoned.

[30] Foreign Application Priority Data

Dec. 18, 1990 [JP] Japan ................................... 2-411253

[51] Int. Cl.⁶ .................................................. C01B 21/20
[52] U.S. Cl. .................................. 423/213.2; 423/239.2; 502/243; 502/347
[58] Field of Search ............................. 423/213.2, 239.2; 502/243, 342

[56] References Cited

U.S. PATENT DOCUMENTS

| | | | |
|---|---|---|---|
| 3,346,328 | 10/1967 | Sergeys et al. | 502/60 |
| 3,447,893 | 6/1969 | Stephens et al. | 423/213.2 |
| 5,149,511 | 9/1992 | Montreuil et al. | 423/239.2 |
| 5,206,196 | 4/1993 | Nakano et al. | 502/73 |
| 5,208,198 | 5/1993 | Nakano et al. | 502/74 |
| 5,223,236 | 6/1993 | Inoue et al. | 423/213.2 |
| 5,270,024 | 12/1993 | Kasahara et al. | 423/247 |
| 5,382,416 | 1/1995 | Nakano et al. | 423/247 |

FOREIGN PATENT DOCUMENTS

| | | | |
|---|---|---|---|
| 136785 | 4/1985 | European Pat. Off. | 502/77 |
| 286967 | 10/1988 | European Pat. Off. | 423/239 |
| 0 362 966 | 4/1990 | European Pat. Off. . | |
| 0 373 665 | 6/1990 | European Pat. Off. . | |
| 2097630 | 5/1987 | Japan | 423/239 |
| 63-283727 | 11/1988 | Japan . | |
| 1130735 | 5/1989 | Japan . | |

*Primary Examiner*—Helane Myers
*Attorney, Agent, or Firm*—Oblon, Spivak, McClelland, Maier & Neustadt, P.C.

[57] ABSTRACT

A catalyst for purifying an exhaust gas to remove nitrogen oxides, carbon monoxide and hydrocarbons from an oxygen rich exhaust gas containing the same, comprising (i) a zeolite having an $SiO_2/Al_2O_3$ mole ratio of at least 15 and (ii) (a) silver and, optionally, (b) an alkali metal and/or an alkaline earth metal incorporated therein.

3 Claims, No Drawings

CATALYST FOR PURIFYING EXHAUST GAS

This application is a continuation of application Ser. No. 07/805,052, filed on Dec. 11, 1991, now abandoned.

BACKGROUND OF THE INVENTION

1. Field of the Invention

The present invention relates to a catalyst for purifying an exhaust gas to remove nitrogen oxides, carbon monoxide and hydrocarbons contained in an exhaust gas discharged, for example, from internal combustion engines of automobiles and the like, more specifically, it relates to a catalyst for removing nitrogen oxides contained in an oxygen rich exhaust gas.

The term "oxygen rich exhaust gas" herein used is intended to mean an exhaust gas containing oxygen in an amount exceeding the amount of oxygen necessary for completely oxidizing carbon monoxide, hydrocarbons and hydrogen contained in the exhaust gas. Specific examples of such an exhaust gas include exhaust gases discharged, for example, from internal combustion engines of automobiles, particularly exhaust gases produced at a high air/fuel ratio (i.e., in the lean burn region).

2. Description of the Related Art

Nitrogen oxides, carbon monoxide and hydrocarbons, which are toxic substances contained in an exhaust gas discharged from internal combustion engines, are removed, for example, through the use of a three-way catalyst comprising Pt, Rh, Pd, etc., supported on a carrier material. In the case of an exhaust gas discharged from diesel engines, however, no effective catalyst exists for removing nitrogen oxides because the exhaust gas contains a large amount of oxygen, and thus a purification of the exhaust gas by means of a catalyst has not been practiced.

In current gasoline engines, a lean burn combustion is used for the purpose of lowering the fuel consumption and reducing the amount of exhausted carbon dioxide gas, but an exhaust gas from this lean burn gasoline engine comprises an oxygen rich atmosphere, and accordingly, it is impossible to use the above-mentioned conventional three-way catalyst, and thus no practical method of removing toxic components from the exhaust gas has been known.

Examples of the method of removing, in particular, nitrogen oxides in an oxygen rich exhaust gas include that wherein a reducing agent such as ammonia is added, and that wherein the nitrogen oxides are absorbed in an alkali, to thus remove the nitrogen oxides. These methods, however, are not effective for automobiles, which are a moving nitrogen oxides source, and thus the application thereof is limited.

It has been reported that a zeolite catalyst subjected to an ion exchange with a transition metal can remove nitrogen oxides in an oxygen rich exhaust gas, without the addition of a special reducing agent such as ammonia. For example, Japanese Unexamined Patent Publication (Kokai) Nos. 63-283727 and 1-130735 propose a catalyst capable of selectively reducing nitrogen oxides even in an oxygen rich exhaust gas containing minor amounts of reducing agents such as unburnt carbon monoxide and hydrocarbons.

Nevertheless, in the conventional zeolite catalysts, since elements in the fourth period, such as copper, nickel and cobalt, are used as a main active metal, the temperature region in which the nitrogen oxides can be removed is relatively narrow, and therefore, a higher capability of purifying nitrogen oxides in a broader temperature region, particularly at a low temperature, is required from a catalyst used for purifying an exhaust gas discharged, in particular, from automobiles.

SUMMARY OF THE INVENTION

Accordingly, the objects of the present invention are to eliminate the above-mentioned disadvantages of the prior art and to provide a catalyst for purifying an exhaust gas having a high catalytic performance such that nitrogen oxides, carbon monoxide and hydrocarbons can be simultaneously removed from an exhaust gas discharged from internal combustion engines of automobiles, etc., in a relatively broad temperature region.

Another object of the present invention is to provide a method of purifying an exhaust gas through the use of a catalyst of the type described above.

Other objects and advantages of the present invention will be apparent from the following description.

In accordance with the present invention, there is provided a catalyst for purifying an exhaust gas to remove nitrogen oxides, carbon monoxide and hydrocarbons from an oxygen rich exhaust gas containing the same, comprising (i) a zeolite having an $SiO_2/Al_2O_3$ mole ratio of at least 15 and (ii), silver incorporated thereinto.

In accordance with the present invention, there is also provided a catalyst for purifying an exhaust gas to remove nitrogen oxides, carbon oxide, and hydrocarbons from an oxygen rich exhaust gas containing the same, comprising (i) a zeolite having an $SiO_2/Al_2O_3$ mole ratio of at least 15 and (ii) (a), silver and (b) an alkali metal and/or an alkaline earth metal, both incorporated thereinto.

DESCRIPTION OF THE PREFERRED EMBODIMENTS

The present inventors have made extensive and intensive studies of the above-mentioned problems, and as a result, have found that a catalyst comprising (i) a zeolite having an $SiO_2/Al_2O_3$ mole ratio of 15 or more and (ii) silver or (ii) (a) silver and (b) an alkali metal and/or an alkaline earth metal is capable of purifying nitrogen oxides in a relatively broad temperature region, and thus completed the present invention.

The present invention will now be described in more detail.

The catalyst for purifying an exhaust gas according to the first embodiment of the present invention comprises (i) a zeolite having an $SiO_2/Al_2O_3$ mole ratio of at least 15 and (ii) silver incorporated thereinto.

The zeolite generally has the following composition:

$$xM_{2/n}O \cdot Al_2O_3 \cdot ySiO_2 \cdot zH_2O \ldots \quad (I)$$

wherein n is a valency of the cation M, x is 0.8 to 1.2, y is 2 or more and z is 0 (zero) or more. In the zeolite used in the present invention, the $SiO_2/Al_2O_3$ mole ratio is preferably at least 15. There is no particular limitation of the upper limit of the $SiO_2/Al_2O_3$ mole ratio, but when the $SiO_2/Al_2O_3$ mole ratio is less than 15, the heat resistance and durability of the zeolite per se are low, and thus the heat resistance and durability of the catalyst are unsatisfactory. The $SiO_2/Al_2O_3$ mole ratio is preferably about 15 to 1000.

The zeolite constituting the catalyst of the present invention may be any of naturally-occurring zeolite and synthetic zeolite, and there is no particular limitation of the method of producing the zeolite. Representative examples of the zeolite used in the present invention include ferrierite, Y, ZSM-5, ZSM-11, ZSM-12 and ZSM-20, and these zeolites per se may be used as the catalyst of the present invention, or after treatment with an ammonium salt, a mineral acid or the like for an ion exchange to form an $NH_4$ or H type zeolite, or after an ion exchange with an alkali metal or an alkaline earth metal.

The zeolite used in the present invention must contain silver. There is no particular limitation of the method of incorporating silver into the zeolite, and in general, silver can be incorporated by an ion exchange method, an impregnation method, and an evaporation-to-dryness method through the use of a water soluble salt.

When incorporating silver into the zeolite, the concentration of silver ions in the aqueous solution can be properly selected depending upon the intended percentage ion exchange of the catalyst. The silver ions may be used in the form of a soluble salt, and suitable examples of the soluble salt include nitrate, acetate, and oxalate.

The silver content is preferably 0.1 to 1.5, more preferably 0.2 to 1.4, in terms of the mole ratio of silver to alumina in the zeolite.

The catalyst for purifying an exhaust gas according to the second embodiment of the present invention comprises a zeolite and, incorporated therein, silver and an alkali metal and/or an alkaline earth metal. The zeolite may originally contain the alkali metal and/or the alkaline earth metal. Examples of the alkali metal are lithium, sodium, potassium, caesium and examples of the alkaline earth metal are calcium, magnesium, strontium, barium. Alternatively, the alkali metal and/or the alkaline earth metal may be incorporated later. There is no particular limitation of the method of incorporating the alkali metal and/or the alkaline earth metal later, and the incorporation may be conducted by the ion exchange method. The ion exchange may be conducted by the conventional procedure through the use of a soluble salt of an alkali metal and/or an alkaline earth metal. Examples of the soluble salt include nitrate, acetate, oxalate and chloride.

The alkali metal and/or alkaline earth metal content is preferably 0.1 to 1.2, more preferably 0.2 to 1.1, in terms of the mole ratio of alkali metal oxides and/or alkali earth metal oxides to alumina in the zeolite.

The sample containing silver is generally used after solid-liquid separation, washing and drying, and if necessary, can be used after calcination.

The catalyst for purifying an exhaust gas according to the present invention may be used after mixing with a binder, such as a clay mineral, and then molding. Alternatively, the zeolite may be previously molded, and silver and, if any, an alkali metal and/or an alkaline earth metal, may be incorporated into the molding. Examples of the binder used in molding of the zeolite include clay minerals such as kaolin, attapulgite, montmorillonite, bentonite, allophane and sepiolite, silica and alumina. Alternatively, the catalyst may be a binder-less zeolite molding directly synthesized without the use of a binder. Further, the zeolite may be wash-coated on a honeycomb-structured base material made of cordierite, a metal or the like.

The nitrogen oxides, carbon monoxide and hydrocarbons contained in an oxygen rich exhaust gas can be removed by bringing the exhaust gas into contact with the catalyst for purifying an exhaust gas according to the present invention.

There is no particular limitation in the operating conditions of the catalyst according to the present invention, but the preferable temperature is 100° C. to 900° C., more preferably 150° C. to 800° C. and the preferable space velocity is 1,000 to 500,000 hr$^{-1}$. The "space velocity" means a value of a gas flow rate (cc/hr) divided by a catalyst volume (cc).

The above-mentioned catalyst for purifying an exhaust gas purification exhibits no change in the performance even when applied to an exhaust gas containing carbon monoxide, hydrocarbons and hydrogen but not containing an excess amount of oxygen.

EXAMPLES

The present invention will now be described in more detail with reference to the following Examples, but it is no way limited to these Examples.

Example 1: Preparation of catalyst 1

A ZSM-5-like zeolite was synthesized according to the method described in Example 5 of Japanese Unexamined Patent Publication (Kokai) No. 59-54620. The zeolite had the following composition in terms of mole ratios of oxides on an anhydrous basis:

1.1 $Na_2O \cdot Al_2O_3 \cdot 40\ SiO_2$.

First, 20 g of the resultant Na type ZSM-5 was put in 180 ml of a 0.04 mol/liter aqueous silver nitrate solution, and the mixture was stirred at 80° C. for 16 hrs. The mixture was subjected to solid-liquid separation, and the solid was thoroughly washed with water and dried at 110° C. for 20 hrs, to thereby prepare a catalyst 1.

The catalyst 1 was subjected to a chemical analysis, and as a result, found to have an $Ag_2O/Al_2O_3$ mole ratio of 0.63 and an $Na_2O/Al_2O_3$ mole ratio of 0.39.

Example 2: Preparation of Catalyst 2

The Na type ZSM-5 synthesized in Example 1 was ion-exchanged with an aqueous ammonium nitrate solution to give $NH_4$ type ZSM-5, 20 g of the $NH_4$ type ZSM-5 was put in 180 ml of a 0.2 mol/liter aqueous silver nitrate solution, and the slurry was stirred at 80° C. for 16 hrs. The slurry was subjected to solid-liquid separation, the zeolite cake was put in a freshly prepared aqueous solution having the above-mentioned composition, and the above-mentioned procedure was repeated. The slurry was subjected to solid-liquid separation, and the solid was dried at 110° C. for 20 hrs to give a catalyst 2. The catalyst 2 was subjected to a chemical analysis and found to have an $Ag_2O/Al_2O_3$ mole ratio of 0.74.

Example 3: Preparation of Catalyst 3

First, 20 g of the $NH_4$ type ZSM-5 prepared in Example 2 was put in 180 g of a 1.09 mol/liter aqueous barium chloride solution, the mixture was stirred at 80° C. for 16 hrs, and then subjected to solid-liquid separation. The solid was washed with water and subsequently put in 180 ml of a 0.04 mol/liter aqueous silver nitrate solution, and the mixture was stirred at 80° C. for 16 hrs. The mixture was subjected to solid-liquid separation, and the solid was thoroughly washed with water and dried at 110° C. for 20 hrs to give a catalyst 3. The catalyst 3 was subjected to a chemical analysis and found to have an $Ag_2O/Al_2O_3$ mole ratio of 0.42 and a $Ba_2O/Al_2O_3$ mole ratio of 0.50.

Comparative Example 1: Preparation of Comparative Catalyst 1

First, 1 kg of the $NH_4$ type ZSM-5 prepared in Example 2 was added to a 0.1 mol/liter copper acetate solution so that the number of copper atoms was one time the number of Al atoms in the zeolite. Thereafter, 2.5% aqueous ammonia was added to adjust the pH to 10.5, and the mixture was stirred at room temperature for 20 hrs, to thereby conduct an ion exchange treatment. This procedure was repeated twice. The resultant solid was washed and dried at 110° C. for 12 hrs to give a comparative catalyst 1. The comparative catalyst 1 was subjected to a chemical analysis and found to have an a CuO/Al$_2$O$_3$ mole ratio of 1.05.

Comparative Example 2: Preparation of Comparative Catalyst 2

First, 20 g of the NH$_4$ type ZSM-5 prepared in Example 2 was put in 180 ml of a 0.23 mol/liter cobalt (II) acetate tetrahydrate solution, and the mixture was stirred at 80° C. for 16 hrs. The slurry was subjected to solid-liquid separation, the zeolite cake was put in a freshly prepared aqueous solution having the above-described composition, and the above-mentioned procedure was repeated. The slurry was subjected to solid-liquid separation, and the solid was thoroughly washed with water and dried at 110° C. for 10 hrs to give a comparative catalyst 2. The comparative catalyst 2 was subjected to a chemical analysis and found to have an CoO/Al$_2$O$_3$ mole ratio of 1.39.

Comparative Example 3: Preparation of Comparative Catalyst 3

First, 20 g of the NH4 type ZSM-5 prepared in Example 2 was put in 180 g of a 0.23 mol/liter nickel acetate tetrahydrate solution, and the mixture was stirred at 80° C. for 16 hrs. The slurry was subjected to solid-liquid separation, the zeolite cake was put in a freshly prepared aqueous solution having the above-described composition, and the above-mentioned procedure was repeated. The slurry was subjected to solid-liquid separation, and the solid was thoroughly washed with eater and dried at 110° C. for 10 hrs to give a comparative catalyst 3. The comparative catalyst 3 was subjected to a chemical analysis and found to have an NiO/Al$_2$O$_3$ mole ratio of 1.40.

Example 4: Evaluation of Catalytic Activity

Catalysts 1 to 3 and comparative catalysts 1 to 3 were press-molded and then crushed to regulate the size of granules to 12 to 20 meshes, and an atmospheric fixed bed type reaction tube was packed with 1 g of each of the granular catalysts. The temperature of the catalyst bed was raised to 500° C. while passing a gas having the following composition (hereinafter referred to as "reaction gas") through the reaction tube at a flow rate of 1000 ml/min, and the temperature was maintained at 500° C. for 0.5 hr, to thereby conduct a pretreatment. Thereafter, the reaction tube of the catalyst bed was raised from 300° to 500° C. In this case, the temperature was kept constant at each 50° C. increment, to measure the catalytic activity at respective temperatures. The NOx conversions at respective temperatures after the state became steady are given in Table 1. The NOx conversion can be determined by the following equation.

$$NOx \text{ conversion } (\%) = \frac{NOx_{in} - NOx_{out}}{NOx_{in}} \times 100$$

wherein $NOx_{in}$: NOx concentration at inlet of fixed bed type reaction tube; and
$NOx_{out}$: NOx concentration at outlet of fixed bed type reaction tube.

In the catalysts, little carbon monoxide and hydrocarbons were detected at 400° C. or above.

| Composition of reaction gas | |
|---|---|
| NO | 700 ppm |
| O$_2$ | 4% |
| H$_2$ | 330 ppm |
| CO | 1000 ppm |
| C$_3$H$_6$ | 400 ppm |
| H$_2$O | 3% |
| CO$_2$ | 10% |
| N$_2$ | balance |

TABLE 1

| | Temp. (°C.) | Catalyst 1 | Catalyst 2 | Catalyst 3 | Comp. catalyst 1 | Comp. catalyst 2 | Comp. catalyst 3 |
|---|---|---|---|---|---|---|---|
| NOx conversion at respective temps. (%) | 300 | 35 | 12 | 15 | 34 | 5 | 10 |
| | 350 | 46 | 33 | 41 | 39 | 15 | 31 |
| | 400 | 57 | 53 | 63 | 48 | 52 | 36 |
| | 450 | 54 | 47 | 71 | 39 | 42 | 32 |
| | 500 | 38 | 39 | 68 | 34 | 33 | 28 |
| Temp. region where NOx conversion is 40% or more (°C.) | | 320 490 | 360 490 | 350 580 | 360 440 | 390 460 | — |

As apparent from Table 1, the catalysts of the present invention can remove nitrogen oxides in a larger temperature range and have a higher capability of purifying an exhaust gas containing an excess amount of oxygen, compared with the comparative catalysts.

Namely, the use of the catalyst for purifying an exhaust gas purification catalyst according to the present invention enables nitrogen oxides in an exhaust gas containing an excess amount of oxygen to be removed with a high NOx conversion.

We claim:

1. A method for reducing nitrogen oxides by hydrocarbons present in an oxygen-rich exhaust gas containing nitrogen oxides hydrogen, carbon monoxide, hydrocarbons and oxygen, comprising:
    bringing said exhaust gas into contact with a catalyst comprising (i) a zeolite having an SiO$_2$/Al$_2$O$_3$ mole ratio of at least 15 which is a member selected from the group consisting of ferrierite, Y, ZSM-5, ZSM-11, ZSM-12 and ZSM-20 and (ii)(a) silver incorporated therein, the silver content ranging from 0.1 to 1.5 in terms of the mole ratio of silver oxide to alumina in the zeolite, and (b) at least one metal selected from the group consisting of an alkali metal and an alkaline earth metal, both incorporated therein, wherein the content of the metal selected from the group consisting of an alkali metal and an alkaline earth metal is 0.1 to 1.2, in terms of the mole ratio of alkali metal oxides and/or alkaline earth metal oxides to alumina in the zeolite.

2. The method of claim 1, wherein said contacting step is performed at a temperature of from 100° C. to 900° C. and a space velocity of from 1,000 to 500,000 hr$^{-1}$, wherein said space velocity is defined as a gas flow rate divided by a catalyst volume.

3. The method of claim 1, wherein, over the temperature range of reduction, at least 40% of the nitrogen oxides in the exhaust gas are reduced.

* * * * *

UNITED STATES PATENT AND TRADEMARK OFFICE
CERTIFICATE OF CORRECTION

PATENT NO. : 5,807,528
DATED : Sept. 15, 1998
INVENTOR(S) : Masao Nakano et al.

It is certified that error appears in the above-identified patent and that said Letters Patent is hereby corrected as shown below:

Column 6, line 42, "nitrogen oxides hydrogen," should read --nitrogen oxides,--;

line 53, "metal, both incorporated therein, wherein the content of" should read --metal, wherein the content of --;

line 54, "the metal selected from the group consisting of an" should read --each metal--;

line 55, "alkali metal and an alkaline earth metal is 0.1 to 1.2, in" should read --in the catalyst ranges from 0.1 to 1.2, in--;

line 56, "oxides" should read --oxide--;

line 57, "oxides" should read --oxide--.

Signed and Sealed this

Twenty-first Day of March, 2000

Attest:

Q. TODD DICKINSON

Attesting Officer

Commissioner of Patents and Trademarks